US011525639B2

(12) United States Patent
Hjelmeland et al.

(10) Patent No.: US 11,525,639 B2
(45) Date of Patent: Dec. 13, 2022

(54) SUBMERGED COOLER ARRANGEMENTS

(71) Applicant: FUTURE TECHNOLOGY AS, Sandefjord (NO)

(72) Inventors: Jan Thore Hjelmeland, Holmestrand (NO); André Jacobsen, Tolvsrød (NO)

(73) Assignee: FUTURE TECHNOLOGY AS, Sandefjord (NO)

( * ) Notice: Subject to any disclaimer, the term of this patent is extended or adjusted under 35 U.S.C. 154(b) by 0 days.

(21) Appl. No.: 17/413,398

(22) PCT Filed: Dec. 12, 2019

(86) PCT No.: PCT/NO2019/050273
§ 371 (c)(1),
(2) Date: Jun. 11, 2021

(87) PCT Pub. No.: WO2020/122733
PCT Pub. Date: Jun. 18, 2020

(65) Prior Publication Data
US 2022/0034604 A1 Feb. 3, 2022

(30) Foreign Application Priority Data
Dec. 14, 2018 (NO) .................................. 20181617

(51) Int. Cl.
| F28F 9/013 | (2006.01) |
|---|---|
| E21B 36/00 | (2006.01) |
| F16L 3/08 | (2006.01) |
| F16L 3/223 | (2006.01) |
| F16L 58/18 | (2006.01) |
| F28D 1/02 | (2006.01) |

(52) U.S. Cl.
CPC ............ *F28F 9/013* (2013.01); *E21B 36/001* (2013.01); *F16L 3/08* (2013.01); *F16L 3/2235* (2013.01); *F16L 58/18* (2013.01); *F28D 1/022* (2013.01); *F28F 2280/10* (2013.01)

(58) Field of Classification Search
CPC ....... E21B 36/001; F28F 2280/00; F16L 3/22; F16L 3/24; F16L 3/18
USPC .......... 248/49, 72, 65, 73, 74.1, 74.3, 188.1, 248/671; 52/220.1, 651.02, 677, 708
See application file for complete search history.

(56) References Cited

U.S. PATENT DOCUMENTS

| 2,198,529 A | 4/1940 | Fields |
|---|---|---|
| 2,581,121 A | 1/1952 | McCurdy, Jr. |
| (Continued) | | |

FOREIGN PATENT DOCUMENTS

| CN | 202674551 U | 1/2013 |
|---|---|---|
| CN | 204677896 | 9/2015 |
| (Continued) | | |

OTHER PUBLICATIONS

Norwegian Search Report mailed in 20181617 dated Jul. 9, 2019 (2 pages).

(Continued)

*Primary Examiner* — Muhammad Ijaz
(74) *Attorney, Agent, or Firm* — Wissing Miller LLP

(57) ABSTRACT

The present invention relates to improved subsea or submerged cooler designs for subsea applications, and particularly to a unique pipe support arrangement (5, 16, 17, 18) in a submerged cooler (20), an improved submerged cooler frame (1) and an improved submerged cooler (20).

18 Claims, 7 Drawing Sheets

(56) References Cited

U.S. PATENT DOCUMENTS

| | | | |
|---|---|---|---|
| 4,595,161 A | 6/1986 | Williams | |
| 5,052,474 A | 10/1991 | Bronnert | |
| 6,736,191 B1 | 5/2004 | Lindberg | |
| 2006/0178246 A1* | 8/2006 | Tjerrild | F16L 3/227 482/24 |
| 2008/0250579 A1* | 10/2008 | Sten | E01D 19/106 14/73 |
| 2012/0193080 A1 | 8/2012 | Rasmussen | |
| 2016/0138634 A1* | 5/2016 | Zhang | E04B 1/5812 52/698 |
| 2016/0222761 A1 | 8/2016 | Cain | |

FOREIGN PATENT DOCUMENTS

| | | |
|---|---|---|
| CN | 205806695 | 12/2016 |
| GB | 2024399 | 1/1980 |
| GB | 2548096 | 9/2017 |

OTHER PUBLICATIONS

International Search Report and Written Opinion mailed in PCT/N02019/050273 dated Oct. 10, 2020.(4 pages).
Supplementary European Search Report mailed in EP 19896531 dated Sep. 9, 2022 (5 pages).

\* cited by examiner

SUBMERGED COOLER ARRANGEMENTS

CROSS-REFERENCE TO RELATED APPLICATIONS

This application is a 371 of PCT/NO2019/050273 filed on Dec. 12, 2019, published on Jun. 18, 2020 under publication number WO 2020/122733 A1, which claims priority benefits from Norwegian Patent Application No. 20181617 filed Dec. 14, 2018, both of which are incorporated herein in their entirety by reference.

TECHNICAL FIELD

The present invention relates to improved submerged cooler designs for e.g. subsea applications, such as for example in oil and gas production and in offshore wind power grid link platforms, and particularly to a unique pipe support arrangement in a submerged cooler, an improved submerged cooler frame and an improved submerged cooler.

BACKGROUND OF THE INVENTION

Due to the environment in which different subsea or submersible components, equipment and systems are being used, there are many challenges related to production of oil and gas and/or to offshore electricity production from wind power.

Several subsea or submerged coolers for cooling a well flow, such as for example a hydrocarbon flow, are known.

Passive subsea coolers are usually used, because they are more robust than active subsea coolers. In these solutions related to passive subsea coolers, the fluid to be cooled, e.g. a well flow, is led through a piping constituted of multiple pipes arranged in a large common volume exposed to a cooling fluid, i.e. seawater. The seawater passes through the common volume at a relatively slow rate due to natural convection, i.e. the seawater rises through the subsea cooler since it is heated by the fluid to be cooled. It is thus difficult to regulate or control the cooling effect of passive subsea coolers. Furthermore, longitudinal elongation of the cooler piping, due to thermal expansion, can be expected, because the fluid in the piping has a higher temperature compared to the seawater temperature, and the steel structure of the subsea cooler has a temperature close or equal to the seawater temperature. Because of the differences in temperature and different thermal expansion coefficients, the piping will expand relative to the steel structure when the temperature in the fluid changes over time. This is especially an issue after shut-down and/or start-up operations or procedures. The temperature variations of the seawater and/or the fluid to be cooled over time should thus be taken into account. This effect is dominant in longitudinal direction. This effect is also a challenge to known passive subsea coolers.

SUMMARY OF THE INVENTION

When using a submerged or submersible cooler in shallow waters, marine bio-fouling will attack the structures thereof, thus causing reduced cooling efficiency. To counteract this it is possible to use a material that largely prevents accumulation of marine fouling on the cooler pipes. Thus, the cooler pipes can be made of for example different alloys and/or metals. Some of these alloys and/or metals can show very good resistance against marine bio-fouling and general corrosion. However, the oxide layer that is built up on the surface is soft and cannot withstand abrasion as well as it can be damaged (e.g. mechanically). Sliding between component parts may remove the oxide layer and will increase corrosion rates to an unacceptable level. Furthermore, the material is prone to crevice corrosion. This issue must be addressed in the interface between the pipe support of the submerged cooler and the cooler piping.

In addition, the pipe support beams of the submerged cooler are long and structural integrity is dominated by deformations. The submerged cooler can see loading during its lifespan up to 5G. The input header of the cooler piping is stiff, as such the stiffness of the pipe support beams must be large to reduce loading on the cooler piping. Therefore, this issue must also be addressed.

It is an object of the invention to provide longitudinal elongation of the cooler piping due to thermal expansion over time.

Another object of the invention is to counteract corrosion of the structure and the piping of the submerged cooler as a consequence of abrasion of the oxide layer thereon.

Yet another object of the invention is to enable unobstructed inflow of cold seawater through the submerged cooler or to improve the inflow amount of cold seawater through the submerged cooler.

Yet another object of the invention is to ensure sufficient structural integrity of the submerged cooler.

Yet another object of the invention is to ensure sufficient protection of the submerged cooler and particularly its piping against vibration and shock loads.

Yet another object of the invention is to use pipe support beams that are not welded to the frame of the submerged cooler, which in turn will change and ease the fabrication method.

According to a first aspect of the invention, this is achieved with submerged cooler designs and/or arrangements which alleviate at least some of the dis-advantages of the prior art subsea or submersible coolers.

According to a second aspect of the invention, this is achieved with a unique pipe support of a submerged cooler.

According to a third aspect of the invention, this is achieved with an improved submerged cooler frame.

According to a fourth aspect of the invention, this is achieved with an improved submerged cooler.

The main features of this invention are given in the independent claims. Additional features of the present invention are given in the dependent claims.

The present invention concerns a pipe support arrangement of a structural frame for a submerged cooler. The pipe support arrangement comprises at least one pipe support beam and at least one structural beam of the structural frame. Said at least one pipe support beam is configured for carrying approximately perpendicularly arranged cooler piping for the submerged cooler. Each structural beam comprises at least one first bracket and at least one second bracket. The first and second brackets are firmly arranged onto the structural beam. The first and second brackets are configured for receiving inbetween the pipe support beam. The pipe support beam is supported and hold by the brackets. The pipe support beam is approximately perpendicular to the structural beam. The pipe support beam is also moveably arranged inbetween the brackets. The pipe support arrangement further comprises limitation means. The limitation means is/are configured for securing a predetermined limited translation of the pipe support beam in longitudinal direction with respect to the cooler piping.

The surfaces of the brackets in contact with the pipe support beam and the surfaces of the pipe support beam in contact with the brackets can be polished and/or treated in such a way so that the limited longitudinal translation of the pipe support is made easier.

In one embodiment, the pipe support arrangement can comprise a first bracket plate, a second bracket plate, a first support plate and a second support plate. The first bracket plate can be firmly arranged onto the first bracket. The first bracket plate can have a sliding surface facing the pipe support beam. The first support plate can be firmly arranged onto one side of the pipe support beam. The first support plate can have a sliding surface facing the first bracket. The second bracket plate can be firmly arranged onto the second bracket. The second bracket plate can have a sliding surface facing the pipe support beam. The second support plate can be firmly arranged onto the other side of the pipe support beam. The second support plate can have a sliding surface facing the second bracket. The plates can be made of a material having a low coefficient of friction. Additionally and/or alternatively, the sliding surfaces of the plates can be treated to get a low coefficient of friction. Thus, the limited longitudinal translation of the pipe support will be eased.

In one embodiment, the limitation means comprises at least one lip. Each lip can be firmly arranged on each longitudinal side of each of the brackets. The lips can be configured for securing the predetermined limited translation of the pipe support beam in the longitudinal direction with respect to the cooler piping.

In another embodiment, the limitation means comprises a restraining means and a group of holes through the pipe support beam, the brackets and optional bracket and support plates. The group of holes is parallel to the structural beam. Each of the holes of the brackets and the optional bracket plates can be a circular hole, and each of the holes of the pipe support beam and the optional support plates can be a slit hole. Alternatively, each of the holes of the pipe support beam and the optional support plates can be a circular hole, and each of the holes of the brackets and the optional bracket plates can be a slit hole. Furthermore, the restraining means can be entirely or partially arranged through the group of holes. The restraining means is configured to interact with the slit hole in order to secure the limited translation of the pipe support beam.

The restraining means can comprise one from the group consisting of:

i) at least one coupling nut and at least one restraining bolt installed through some or all of the group of holes and fastened with a respective coupling nut for interacting with the slit hole for moveably connecting together the two brackets and the pipe support beam;

ii) at least one shoulder screw configured to be threaded into at least one circular hole with threads from the plurality of circular holes and to interact with the slit hole for moveably connecting together the two brackets and the pipe support beam;

iii) at least one rivet installed through some or all of the group of holes and configured for interacting with the slit hole and for moveably connecting together the two brackets and the pipe support beam;

iv) a threaded rod passing through the group of holes and connected to two coupling nuts on each side of the brackets;

v) two rods with heads inserted from each side of the brackets and welded together;

vi) at least one stud configured to interact with the slit hole and to be firmly fixed to or welded into at least one circular hole; and/or vii) two bolts with a threaded middle part and cylindrical end like a reversed shoulder screw, the bolts being configured to be threaded into threaded circular holes of the brackets and to interact with the slit hole of the pipe support beam for moveably connecting together the two brackets and the pipe support beam.

Other suitable restraining means not listed above, but securing the limited longitudinal translation of the pipe support beam with respect to the cooler piping, shall also be included.

The limitation means can in a different embodiment comprise at least one stud firmly fixed or welded to each bracket and/or to the structural beam. Said at least one stud is also configured to interact with at least one slit arranged on the pipe support beam.

Between two parallel structural beams of the pipe support arrangement at least one pipe support beam can be approximately perpendicularly arranged in such a way so that said predetermined limited translation of said at least one pipe support beam in longitudinal direction with respect to the cooler piping will be achieved.

The pipe support arrangement can further comprise insulation. The insulation can be at least one of: electrical and/or corrosion resistant. This insulation insulates the pipes from the structural frame and/or the structural beams. The insulation can be: i) arranged between the pipes, the pipe support beams and connection U-bolts or clamps, or ii) built into the pipe support beams or their surfaces, or iii) made by selection of insulation material(s) or coating(s) for the plates combined with insulation of the components restricting the longitudinal movement or translation of the pipe support beams.

The invention concerns also a structural frame of a submerged or submersible cooler comprising at least one pipe support arrangement.

In addition, the invention concerns a submerged or submersible cooler comprising a structural frame comprising at least one pipe support arrangement and a cooler piping. The cooler piping comprises several pipes. The pipes in a row are running approximately perpendicularly to the pipe support beam of the structural frame. The pipes in a row are parallel to each other. The pipes can be firmly connected to the pipe support beam.

Moreover, the invention concerns a submerged or submersible cooler comprising a structural frame and a cooler piping. The structural frame comprises at least one pipe support beam and at least one structural beam. Said at least one pipe support beam is configured for carrying approximately perpendicularly arranged cooler piping. The pipe support beam is approximately perpendicular to the structural beam. The cooler piping comprises several pipes. The pipes in a row are running approximately perpendicularly to the pipe support beam. The pipes in a row are parallel to each other. The pipes can be firmly connected to the pipe support beam. Each pipe support beam comprises pipes arranged on both opposite sides thereof. For example, in one embodiment, when the pipe support beam is horizontal, one group of parallel pipes will be arranged on top of the pipe support beam, and another group of parallel pipes will be suspended under the pipe support beam. Thus, the pipe support beam will prevent longitudinal seawater flow between those two pipe rows/groups at the pipe support beam location, but the area between two pipe rows/groups arranged respectively on neighboring pipe support beams will be fully open for seawater flow passing therethrough.

BRIEF DESCRIPTION OF THE DRAWINGS

These and other aspects of the invention are apparent from and will be further elucidated, by way of example(s), with reference to the drawings, wherein.

DETAILED DESCRIPTION OF THE EMBODIMENTS

Figure 1:
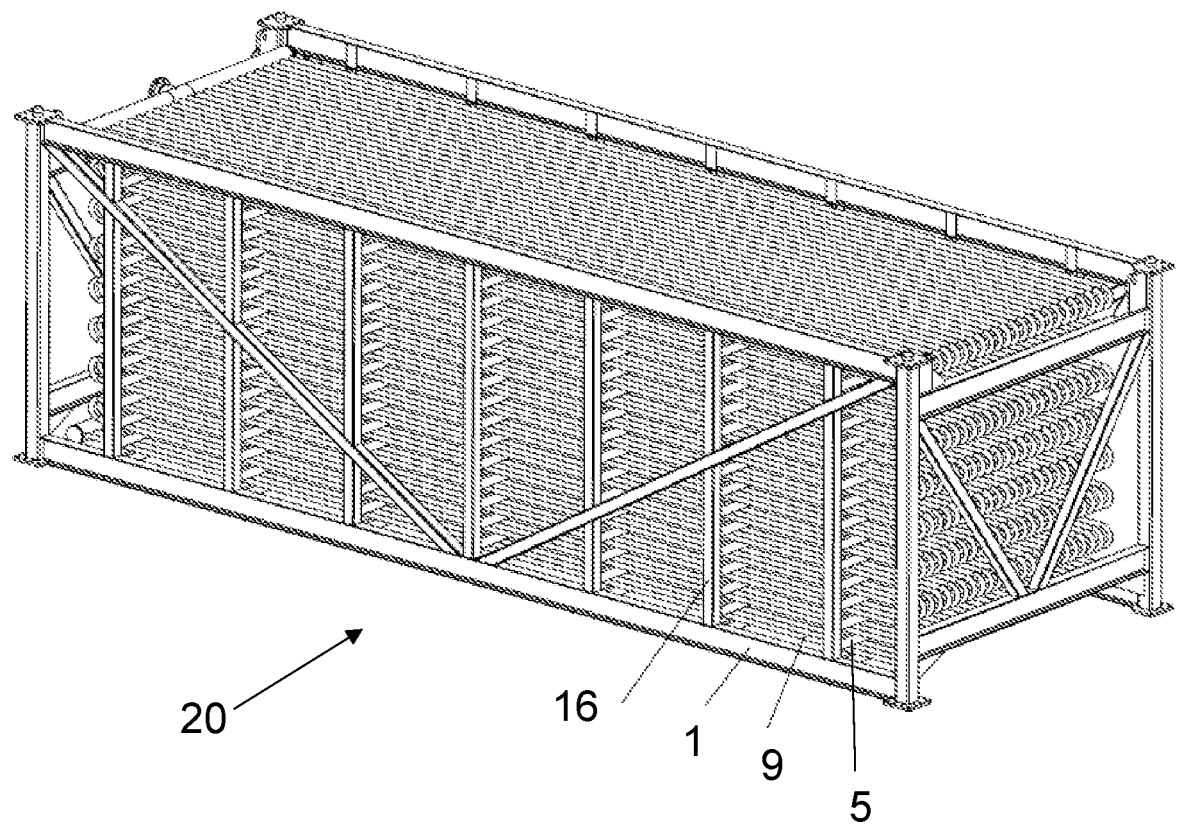
FIG. 1 shows a submerged cooler and a frame/support frame of the submerged cooler according to the present invention.

FIG. 1 illustrates a submerged cooler 20 comprising a structural frame 1 and a cooler piping 9. The frame 1 comprises structural beams 16 and pipe support beams 5, wherein each structural beam 16 is approximately perpendicular to respective pipe support beam(s) 5, and wherein the structural beams of the structural frame 1 are interconnected with the respective pipe support beams of the structural frame 1 as well as with other additional structural beams necessary for achieving a rigid and robust structural frame 1 of the submerged cooler 20. The cooler piping 9 is constituted of multiple pipes.

Figure 2A:
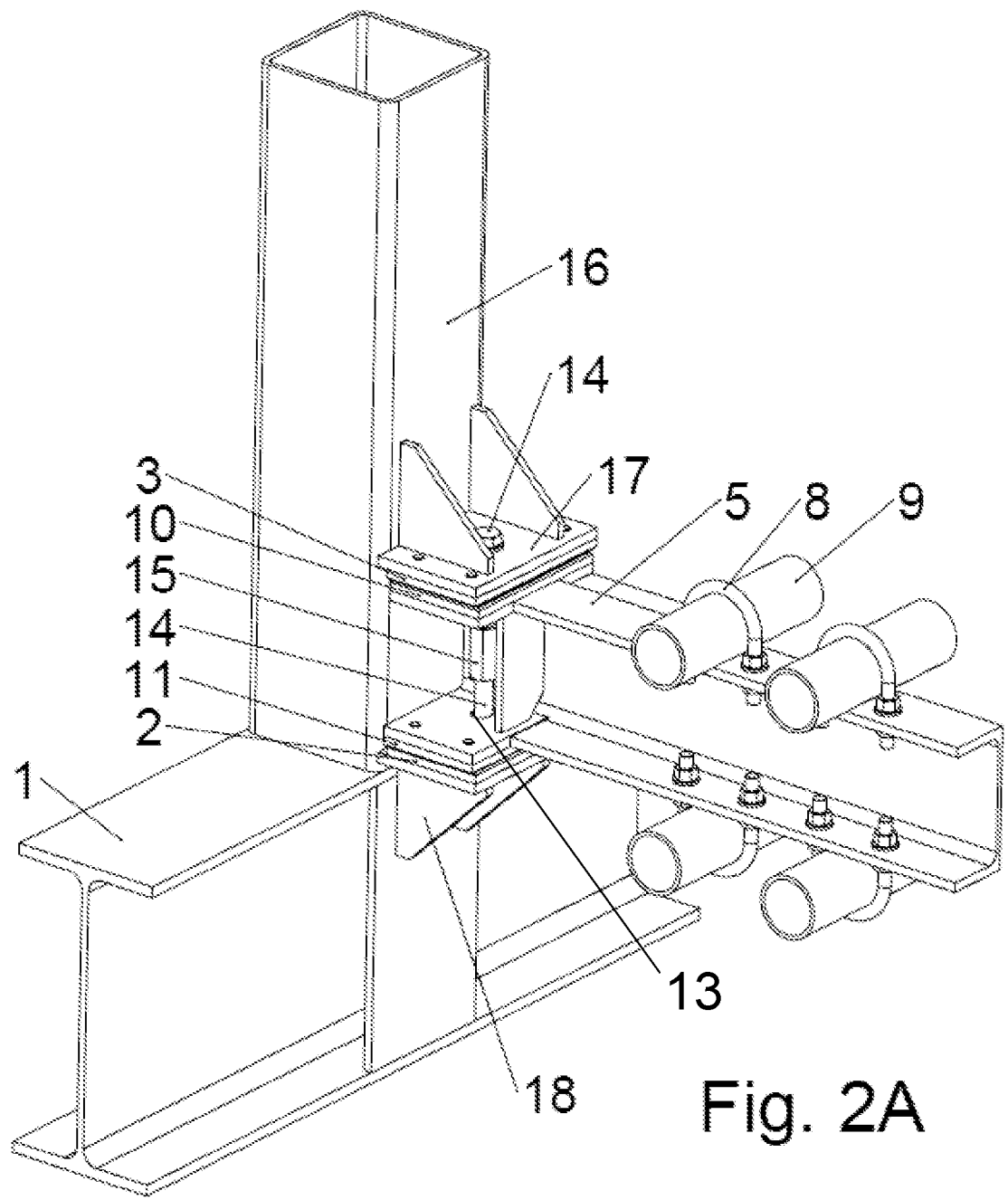
FIGS. 2A-2B illustrate a first embodiment of a pipe support arrangement of a submerged cooler frame in a submerged cooler according to the present invention.
Figure 2B:
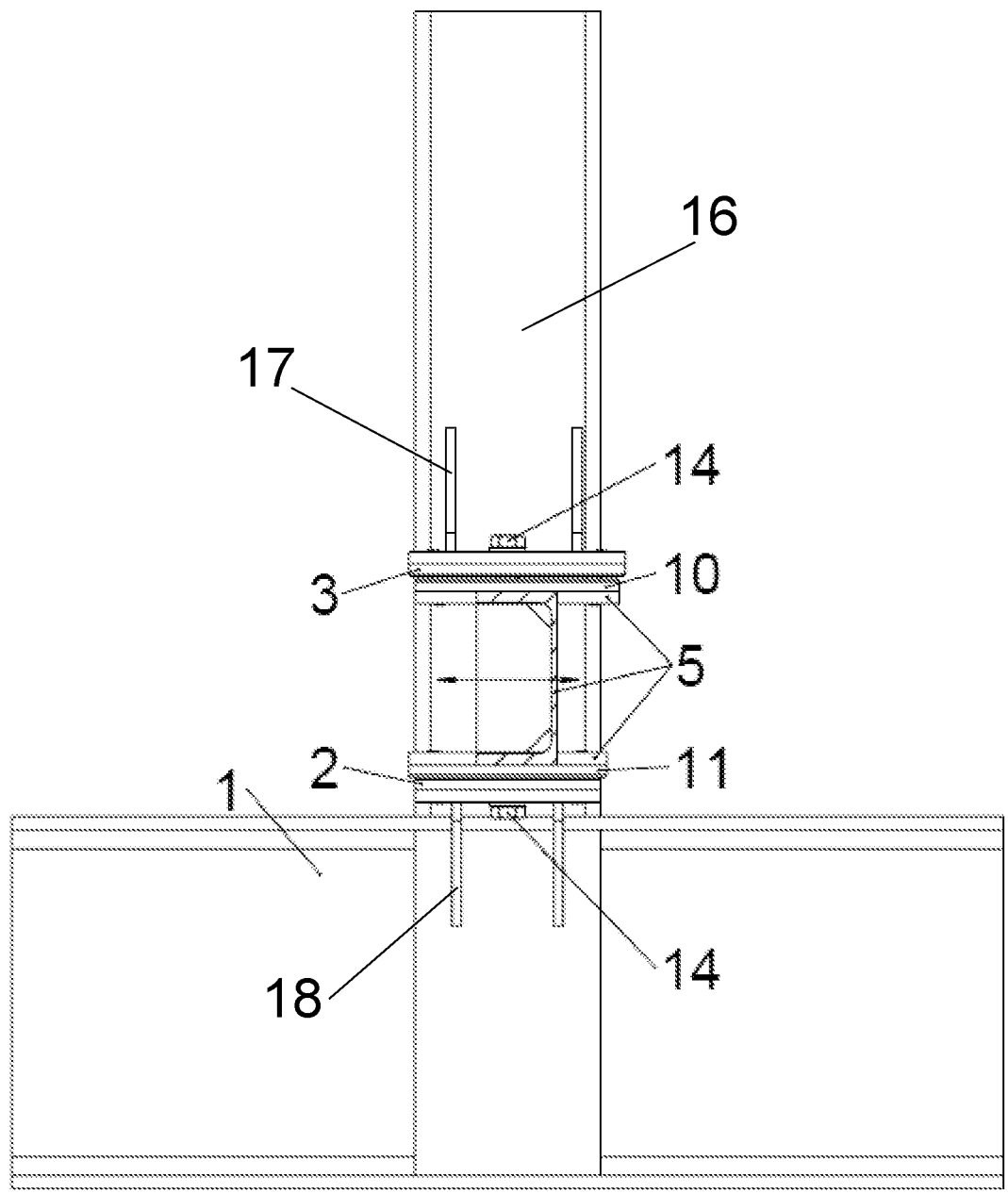

FIGS. 2A-2B show a first solution for longitudinal translation of the pipe support 5 (FIG. 2A) and a detailed view of the sliding faces for longitudinal translation (FIG. 2B).

A first embodiment of a structural frame 1 of a submerged cooler 20 is shown. The structural frame 1 comprises at least one pipe support beam 5 and at least one structural beam 16. Each structural beam 16 comprises at least one first bracket 17 and at least one second bracket 18. The first and second brackets 17, 18 are firmly arranged on the structural beam 16 in such a way so that the pipe support beam 5 fits moveably inbetween them and is hold by the brackets 17, 18. At the same time, the pipe support beam 5 is approximately perpendicular to the structural beam 16. The brackets 17, 18 can be welded onto the structural beam 16. Alternatively, the brackets 17, 18 can be firmly fastened to the structural beam 16 by means of for example one or several bolts 22 and optionally nuts (see for example FIGS. 4A-4B) and/or one or several rivets. Other fastening means for firmly connecting the brackets 17, 18 to the structural beam 16 are also possible. The pipe support beam 5 is carrying a cooler piping 9. The cooler piping 9 comprises several pipes 9. The pipes 9 are running approximately perpendicularly to the pipe support beam 5 and are firmly connected thereto, for example by means of welding, U-bolts or clamps 8 and nuts and/or other fastening means. The pipes 9 are parallel to each other. In one embodiment, the pipes 9 of the cooler piping 9 are arranged on one side of each pipe support beam 5; for example on top of each pipe support beam 5. This typical solution for subsea or submerged coolers shows that the cooler pipes are supported by one beam per row or one beam per column. In another embodiment, some pipes 9 of the cooler piping 9 are arranged on both sides of each pipe support beam 5. For example, some pipes 9 of the cooler piping 9 can be arranged on top of each pipe support beam 5, while the rest of pipes 9 of the cooler piping 9 can be suspended under each pipe support beam 5. With the last solution, the pipe support beam 5 will prevent longitudinal seawater flow between those two pipe rows at the pipe support beam location, but inbetween every second row is fully open for seawater flow that passes therethrough. In some applications, the latter solution will result in a lower longitudinal projected area of the pipe support beams compared to the first solution, thus allowing more free seawater flow through the cooler 20. The surfaces of the brackets 17, 18 in contact with the pipe support beam 5 and the surfaces of the pipe support beam 5 in contact with the brackets 17, 18 can be polished or treated in such a way so that longitudinal translation of the pipe support 5 is being eased. Alternatively, a first bracket plate 3 with sliding surface can be firmly arranged onto the first bracket 17 facing the pipe support beam 5. A first support plate 10 with sliding surface can be firmly arranged onto the pipe support beam 5 facing the first bracket 17. A second bracket plate 2 with sliding surface can be firmly arranged onto the second bracket 18 facing the pipe support beam 5. A second support plate 11 with sliding surface can be firmly arranged onto the pipe support beam 5 facing the second bracket 18. In this case, due to material used for the plates 2, 3, 10, 11, the sliding surfaces thereof can be easily manufactured. For example the plates 2, 3, 10, 11 can be steel plates with a coating or with such a structure that gives low coefficient of friction.

The arrangement can further comprise electrical insulation, where the pipes 9 are insulated from the structural frame 1 and/or beams 16. The electrical insulation can be located between the pipes 9 and the clamps or U-bolts 8 and the pipe support beams 5. Alternatively, the electrical insulation can be built into the pipe support beams 5 or their surfaces. Alternatively, the electrical insulation can be made by selection of insulation material(s) or coating(s) for the plates 2, 3, 10, 11 combined with insulation of the components restricting the longitudinal movement of the pipe support beams 5. Additionally and/or alternatively, the insulation can be corrosion resistant/proof.

Each one from the group of the brackets 17, 18, the pipe support beam 5 and the optional plates 2, 3, 10, 11 can be arranged with a hole 13, 19 therethrough; the group of holes 13, 19 being parallel to the structural beam 16. At least one restraining bolt 14 and coupling nut 15 can be fastened or installed through the hole(s) 13, 19 and connect the two brackets 17, 18 and the pipe support beam 5. The holes 19 of the brackets 17, 18 and the optional bracket plates 2, 3 can be circular holes. The hole(s) 13 of the pipe support beam 5 and the optional support plates 10, 11 can be a slit hole allowing for translation of the pipe support beam 5 in longitudinal direction and within desired limits determined by the slit hole. Alternatively, the hole 13 of the pipe support beam 5 can be a circular hole. The holes 19 of the brackets 17, 18 can be slit holes. In this case, washers can be used. Alternatively, the hole 13 in the pipe support beam 5 can be threaded and two shoulder screws can be used to interface the slit 19 in the brackets 17, 18. It can also be possible, as an alternative, to firmly fix or weld studs into the hole(s) 13 of the pipe support beam 5, which can interface the slit 19 in the brackets 17, 18. Alternatively, as shown on FIGS. 4A-4B, at least one stud 23 can be firmly fixed or welded to each bracket 17, 18 and/or to the structural beam 16 in order to interact with the slit 13' of the pipe support beam 5. The restraining bolt(s) 14 or the like (other suitable fastening means) will prevent motion of the pipe support beam 5 in transverse direction. Other suitable fastening means, such as but not limited to: rivet(s); a through bolt fixed with a nut on opposite side; a threaded rod with two nuts; two rods with heads inserted from each side and welded together; stud welded into the holes 19 of the brackets 17, 18, etc., can also be used (through the hole(s)), wherein the fastening means is(are) configured for allowing for translation of the pipe support beam 5 within desired limits and in longitudinal direction (see the arrows on FIGS. 2B, 3B, 4B) and for preventing motion of the pipe support beam 5 in transverse direction. Alternatively, two specially made bolts with a threaded middle part and cylindrical end like a reversed shoulder screw can be used. Threading the holes 19 in the brackets 17, 18 allows for installation of these bolts after the pipe support beam 5 is correctly placed between the two brackets 17, 18.

Figure 3A:
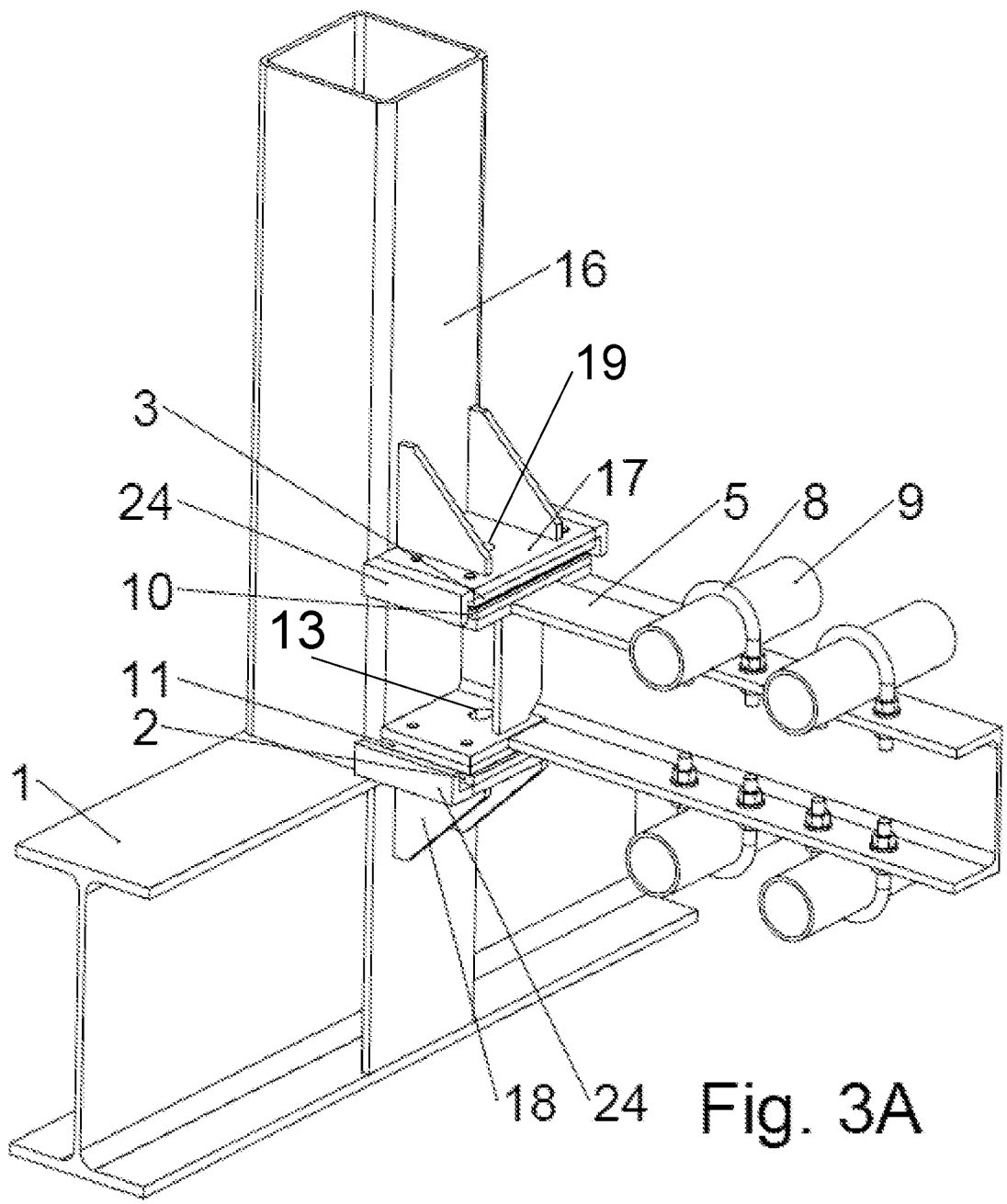
FIGS. 3A-3B illustrate a second embodiment of a pipe support arrangement of a submerged cooler frame in a submerged cooler according to the present invention.
Figure 3B:
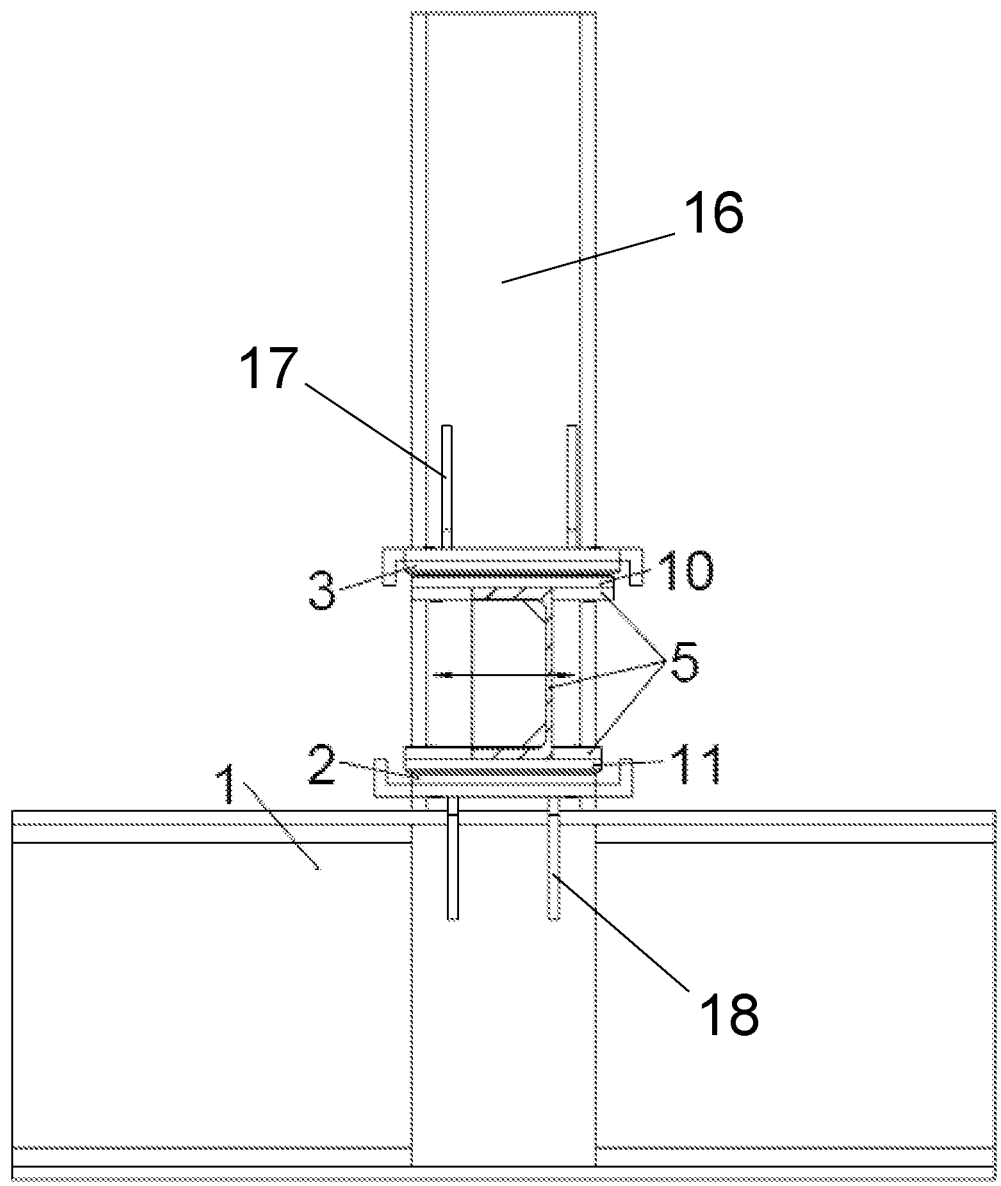

FIGS. 3A-3B show a second solution for longitudinal translation of the pipe support 5 (FIG. 3A) and a detailed view of the sliding faces for longitudinal translation (FIG. 3B). Instead of a hole and a bolt and nut connection or a rivet or stud connection, a lip 24 can be firmly arranged on each side of each of the brackets 17, 18 in order to allow translation of the pipe support beam 5 in longitudinal direction and within desired limits and to prevent motion of the pipe support beam 5 in transverse direction. The lips 24 can be welded, bolted or firmly fastened, by suitable fastening means, to the brackets 17, 18. Alternatively, the lips 24 can constitute a part of the brackets 17, 18.

Figure 4A:
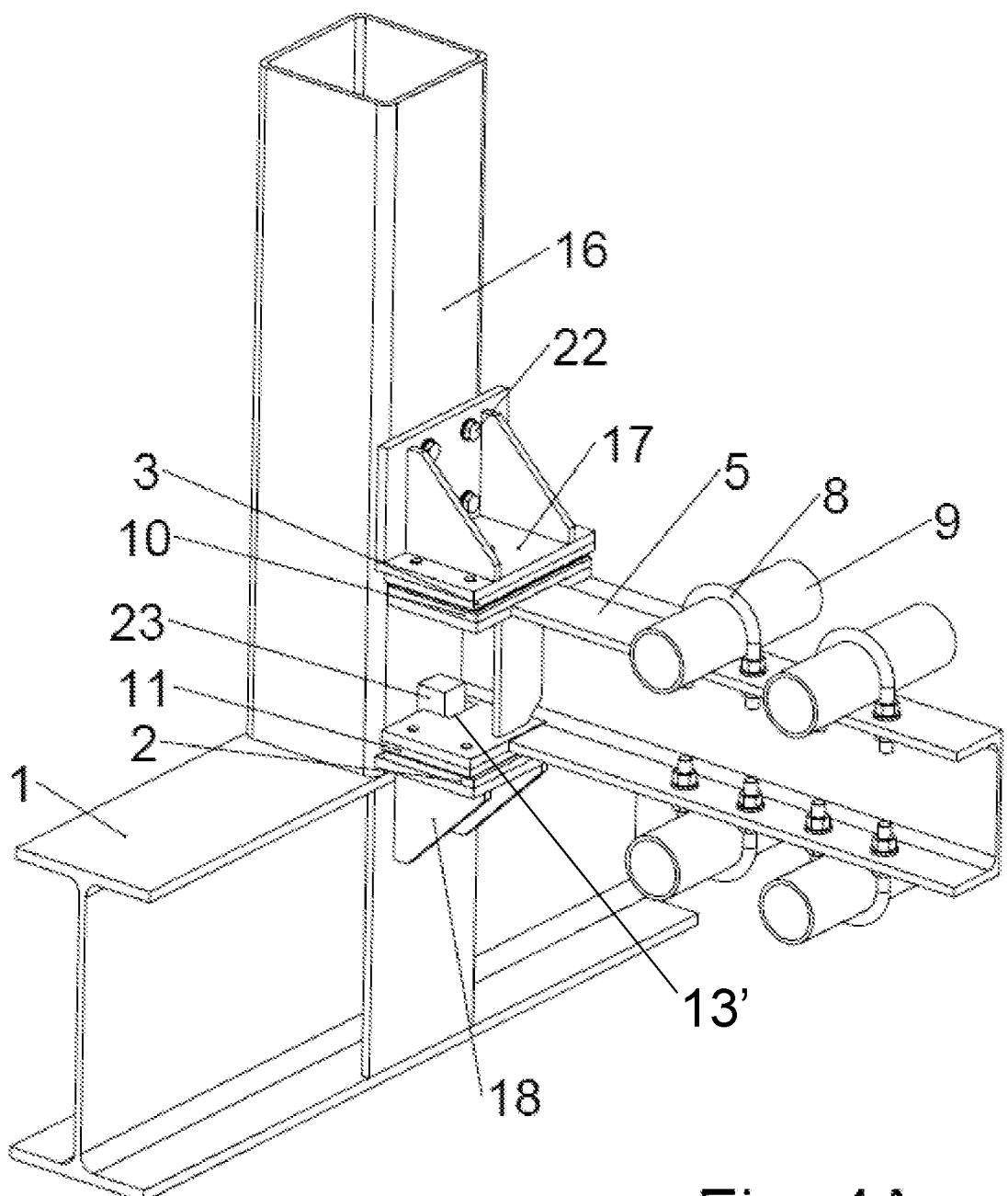
FIGS. 4A-4B show a third embodiment of a pipe support arrangement of a submerged cooler frame in a submerged cooler according to the present invention.
Figure 4B:
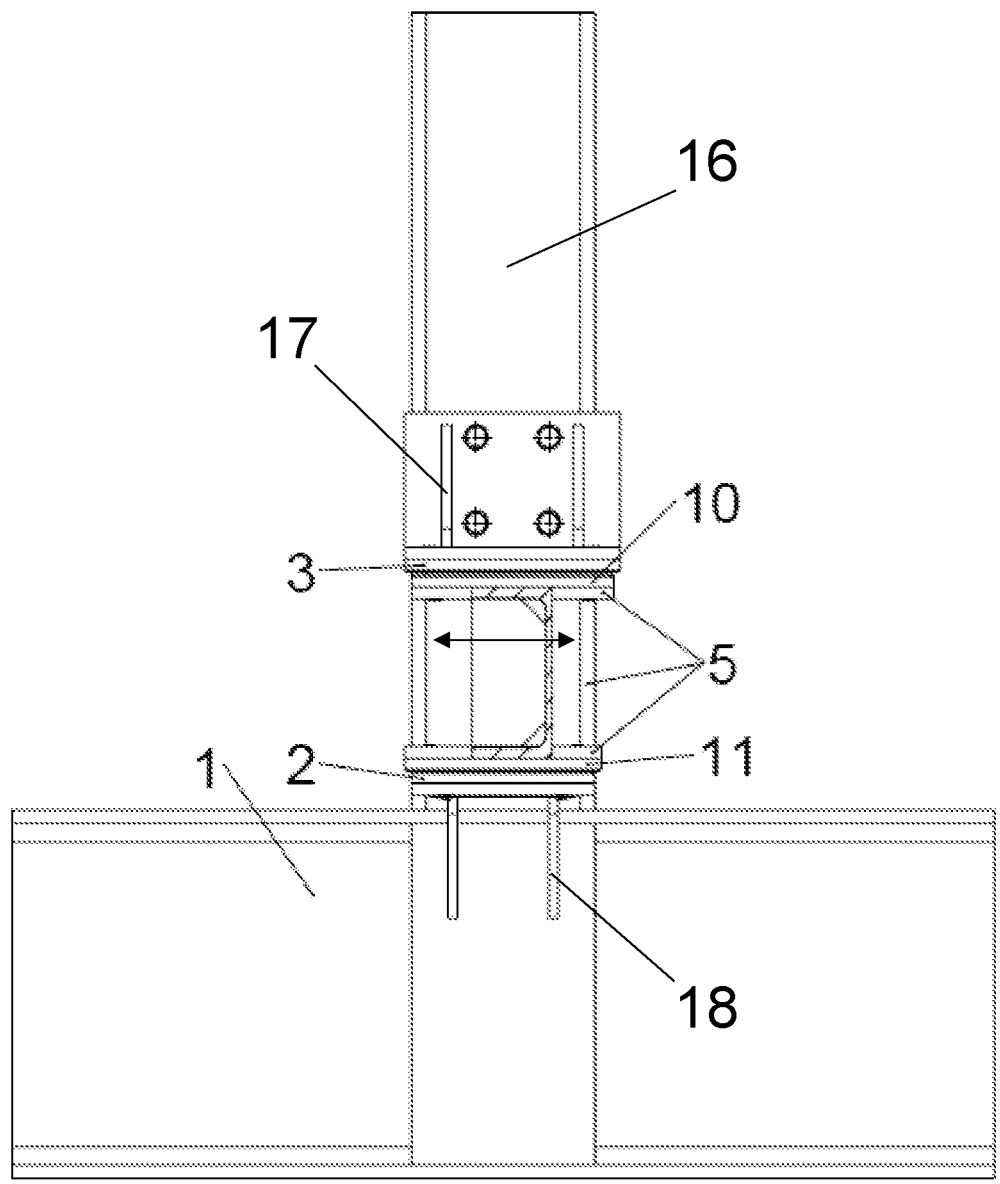

FIGS. 4A-4B show a third solution for longitudinal translation of the pipe support 5 (FIG. 4A) and a detailed view of the sliding faces for longitudinal translation (FIG. 4B). Here it is exemplified that the brackets 17, 18 can be firmly fixed to the structural beam 16 by means of bolt(s) 22 and optionally nut(s). One of several solutions for use of stud(s) is also shown here, where at least one stud 23 is used for interfacing with a slit 13' for achieving limited longitudinal translation of the pipe support beam 5.

The fluid to be cooled and running through the pipes 9 can be a coolant fluid (i.e. a special fluid with one or more additives, such as but not limited to different glycols) or water (if necessary with one or more additives thereto) in cases when the submerged cooler is used for offshore electricity production from wind power. In the oil and gas production the fluid to be cooled and running through the pipes 9 is the production fluid itself.

Additional modifications, alterations and adaptations of the present invention will suggest themselves to those skilled in the art without departing from the scope of the invention as defined in the following patent claims.

The invention claimed is:

1. A pipe support arrangement for a submerged cooler, the pipe support arrangement comprising:
    at least one pipe support beam configured to support approximately perpendicularly arranged cooler piping;
    at least one structural beam having at least one first bracket and at least one second bracket, wherein the at least one first bracket and the at least one second bracket are firmly arranged onto the at least one structural beam and are configured to receive therebetween the at least one pipe support beam so that the at least one pipe support beam is:
        supported and held by the at least one first bracket and the at least one second bracket;
        moveable between the at least one first bracket and the at least one second bracket; and
        approximately perpendicular to the at least one structural beam; and
    at least one translation limiting assembly configured to limit translation of the at least one pipe support beam in a longitudinal direction with respect to the cooler piping.

2. The pipe support arrangement according to claim 1, wherein a surface of the at least one first bracket and a surface of the at least one second bracket in contact with the at least one pipe support beam and one or more surfaces of the at least one pipe support beam in contact with the at least one first bracket and the at least one second bracket are at least one of:
    polished;
    treated in such a way so that the translation of the at least one pipe support beam in the longitudinal direction is eased; and
    polished and treated in such a way so that the translation of the at least one pipe support beam in the longitudinal direction is eased.

3. The pipe support arrangement according to claim 1, wherein the at least one translation limiting assembly comprises a lip firmly arranged on each longitudinal side of each of the at least one first bracket and the at least one second bracket.

4. The pipe support arrangement according to claim 1, wherein the at least one translation limiting assembly comprises a restraining assembly and at least one hole through each of the at least one pipe support beam, the at least one first bracket and the at least one second bracket, wherein the at least one hole through the at least one first bracket and the at least one hole through the at least one second bracket is a circular hole, and the at least one hole through the at least one pipe support beam is a slit hole, and wherein the restraining assembly is entirely or partially arranged through the at least one hole through the at least one pipe support beam, the at least one first bracket and the at least one second bracket and is configured to interact with the slit hole in order to limit translation of the at least one pipe support beam.

5. The pipe support arrangement according to claim 4, wherein the restraining assembly comprises at least one from a group including:
    at least one restraining bolt installed through the at least one hole through each of the at least one pipe support beam, the at least one first bracket and the at least one second bracket and fastened with at least one coupling nut to moveably connect the at least one pipe support beam to the at least one first bracket and the at least one second bracket;
    at least one shoulder screw, wherein at least one of the circular holes is a threaded circular hole, and wherein the at least one shoulder screw is configured to be threaded into the at least one threaded circular hole and to interact with the slit hole to moveably connect the at least one pipe support beam to the at least one first bracket and the at least one second bracket;
    at least one rivet installed through the at least one hole through each of the at least one pipe support beam, the at least one first bracket and the at least one second bracket and configured to interact with the slit hole to moveably connect the at least one pipe support beam to the at least one first bracket and the at least one second bracket;
    a threaded rod passing through the at least one hole through each of the at least one pipe support beam, the at least one first bracket and the at least one second bracket and connected to a coupling nut on each side of the at least one first bracket and the at least one second bracket;
    two rods with heads, wherein one rod is inserted into the at least one hole through the at least one first bracket and the other rod is inserted into the at least one hole through the at least one second bracket, and wherein the two rods are welded together;
    at least one stud configured to interact with the slit hole and to be firmly fixed to or welded into the at least one circular hole through the at least one first bracket or the at least one circular hole through the at least one second bracket; and two bolts with a threaded middle part and cylindrical end, wherein the circular holes of the at least one first bracket and the at least one second bracket are threaded circular holes, and wherein one of the two bolts is configured to be threaded into the threaded circular hole of the at least one first bracket and another of the two bolts is configured to be threaded into the threaded circular hole of the at least one second bracket, and wherein the two bolts interact with the slit hole of the at least one pipe support beam to moveably connect the at least one pipe support beam to the at least one first bracket and the at least one second bracket.

6. The pipe support arrangement according to claim 1, wherein the at least one translation limiting assembly comprises a restraining assembly and at least one hole through each of the at least one pipe support beam, the at least one first bracket and the at least one second bracket, wherein the at least one hole through the at least one pipe support beam is a circular hole, and the at least one hole through the at least one first bracket and at least one hole through the at least one second bracket is a slit hole, and wherein the restraining assembly is entirely or partially arranged through the at least one hole through the at least one pipe support beam, the at least one first bracket and the at least one second bracket and is configured to interact with the slit hole through the at least one first bracket and the slit hole through the at least one second bracket in order to limit translation of the at least one pipe support beam.

7. The pipe support arrangement according to claim 6, wherein the restraining assembly comprises at least one from a group including:

at least one restraining bolt installed through the at least one hole through each of the at least one pipe support beam, the at least one first bracket and the at least one second bracket and fastened with at least one first coupling nut to moveably connect the at least one pipe support beam to the at least one first bracket and the at least one second bracket;

at least one shoulder screw, wherein at least one of the circular holes is a threaded circular hole, and wherein the at least one shoulder screw is configured to be threaded into the at least one threaded circular hole and to interact with the slit hole to moveably connect the at least one pipe support beam to the at least one first bracket and the at least one second bracket;

at least one rivet installed through the at least one hole through each of the at least one pipe support beam, the at least one first bracket and the at least one second bracket and configured to interact with the slit hole to moveably connect the at least one pipe support beam to the at least one first bracket and the at least one second bracket;

a threaded rod passing through the at least one hole through each of the at least one pipe support beam, the at least one first bracket and the at least one second bracket and connected to at least one second coupling nut on each side of the at least one first bracket and the at least one second bracket;

two rods with heads, wherein one of the two rods is inserted into the at least one hole through the at least one first bracket and another of the two rods is inserted into the at least one hole through the at least one second bracket, and wherein the two rods are welded together;

at least one stud configured to interact with the slit hole and to be firmly fixed to or welded into at least one circular hole; and two bolts with a threaded middle part and cylindrical end, wherein the circular holes of the at least one first bracket and the at least one second bracket are threaded circular holes, and wherein the bolts are configured to be threaded into the threaded circular holes of the at least one first bracket and the at least one second bracket and to interact with the slit hole of the at least one pipe support beam to moveably connect the at least one pipe support beam to the at least one first bracket and the at least one second bracket.

8. The pipe support arrangement according to claim 1, wherein the at least one translation limiting assembly comprises at least one of:

at least one stud firmly fixed or welded to the at least one first bracket and the at least one second bracket and configured to interact with at least one slit hole arranged on the at least one pipe support beam;

at least one stud firmly fixed or welded to the at least one structural beam and configured to interact with at least one slit hole arranged on the at least one pipe support beam; and at least one stud firmly fixed or welded to the at least one first bracket and the at least one second bracket and to the at least one structural beam and configured to interact with at least one slit hole through the at least one pipe support beam.

9. The pipe support arrangement according to claim 1, further comprising insulation that insulates the cooler piping from the at least one pipe support beam and the at least one structural beam, wherein the insulation is at least one of electrical insulation and corrosion resistant insulation, and wherein the insulation is at least one from a group including:

arranged between the cooler piping and the at least one pipe support beam;

built into the at least one pipe support beam or surfaces of the at least one pipe support beam.

10. A submerged cooler comprising:

a structural frame including at least one pipe support arrangement, the at least one pipe support arrangement including:

at least one pipe support beam; and at least one structural beam having at least one first bracket and at least one second bracket, wherein the at least one first bracket and the at least one second bracket are firmly arranged onto the at least one structural beam and are configured to receive therebetween the at least one pipe support beam, the at least one pipe support beam being supported and held by the at least one first bracket and the at least one second bracket, wherein the at least one pipe support beam is approximately perpendicular to the at least one structural beam, and wherein the at least one pipe support beam is moveably arranged between the at least one first bracket and the at least one second bracket; and at least one translation limiting assembly configured to limit translation of the at least one pipe support beam; and a plurality of cooler pipes arranged in a plurality of parallel rows, each row running approximately perpendicularly to the at least one pipe support beam and being firmly connected to the at least one pipe support beam, wherein the at least one translation limiting assembly limits translation of the at least one pipe support beam in a longitudinal direction with respect to the plurality of cooler pipes.

11. The submerged cooler according to claim 10, wherein the plurality of cooler pipes are arranged on both opposite sides of the at least one pipe support beam.

12. A pipe support arrangement for a submerged cooler, the pipe support arrangement comprising:
- a plurality of structural beams;
- a plurality of pipe support beams, each of the plurality of pipe support beams being approximately perpendicular to at least one of the plurality of structural beams, each of the plurality of pipe support beams being configured to support approximately perpendicularly arranged cooler piping;
- a plurality of first bracket assemblies and a plurality of second bracket assemblies, wherein one of the plurality of first bracket assemblies and one of the plurality of second bracket assemblies define a pair;
- each first bracket assembly in the pair includes:
  - a first bracket firmly arranged onto one of the plurality of structural beams;
  - a first bracket plate firmly arranged onto the first bracket so that a sliding surface of the first bracket plate faces one of the plurality of pipe support beams; and
  - a first support plate firmly arranged onto the one of the plurality of pipe support beams so that a sliding surface of the first support plate faces the first bracket;
  - wherein the first bracket plate and the first support plate are made of a material having at least one of: i) a low coefficient of friction and ii) the sliding surface of the first bracket plate and the sliding surface of the first support plate are treated to get the low coefficient of friction so that translation of the one of the plurality of pipe support beams in a longitudinal direction is eased;
- each second bracket assembly in the pair includes:
  - a second bracket firmly arranged onto the one of the plurality of structural beams;
  - a second bracket plate firmly arranged onto the second bracket so that a sliding surface of the second bracket plate faces the one of the plurality of pipe support beams; and
  - a second support plate firmly arranged onto the one of the plurality of pipe support beams so that a sliding surface of the second support plate faces the second bracket;
  - wherein the second bracket plate and the second support plate are made of a material having at least one of: i) a low coefficient of friction and ii) the sliding surface of the second bracket plate and the sliding surface of the second support plate are treated to get the low coefficient of friction so that the translation of the one of the plurality of pipe support beams in the longitudinal direction is eased;
- wherein each paired first bracket assembly and second bracket assembly are configured to receive therebetween the one of the plurality of pipe support beams such that the one of the plurality of pipe support beams is moveably arranged between the first bracket and the second bracket; and
- a plurality of translation limiting assemblies, wherein at least one of the plurality of translation limiting assemblies is associated with the pair of first and second bracket assemblies, and wherein the at least one of the plurality of translation limiting assemblies associated with the pair of first and second bracket assemblies is configured to limit translation of the one of the plurality of pipe support beams in the longitudinal direction.

13. The pipe support arrangement according to claim 12, wherein each of the plurality of translation limiting assemblies comprises a restraining assembly and at least one hole through each of the one of the plurality of pipe support beams, the first bracket, the second bracket, the first bracket plate, the first support plate, the second bracket plate and the second support plate, wherein the at least one hole through the first bracket, the second bracket, the first bracket plate and the second bracket plate is a circular hole, and the at least one hole through the one of the plurality of pipe support beams, the first support plate and the second support plate is a slit hole, and wherein the restraining assembly is entirely or partially arranged through the at least one hole through the one of the plurality of pipe support beams, the first bracket, the second bracket, the first bracket plate, the first support plate, the second bracket plate and the second support plate and is configured to interact with the slit hole through the one of the plurality of pipe support beams, the first support plate and the second support plate in order to limit translation of the one of the plurality of pipe support beams.

14. The pipe support arrangement according to claim 13, wherein the restraining assembly comprises at least one from a group including:
- at least one restraining bolt installed through the at least one hole through the one of the plurality of pipe support beams, the first bracket, the second bracket, the first bracket plate, the first support plate, the second bracket plate and the second support plate and fastened with at least one first coupling nut to movably connect the one of the plurality of pipe support beams to the first bracket and the second bracket;
- at least one shoulder screw, wherein at least one of the circular holes is a threaded circular hole, and wherein the at least one shoulder screw is configured to be threaded into the at least one circular hole with threads and to interact with the slit hole to moveably connect the one of the plurality of pipe support beams to the first bracket and the second bracket;
- at least one rivet installed through the at least one hole through the one of the plurality of pipe support beams, the first bracket, the second bracket, the first bracket plate, the first support plate, the second bracket plate and the second support plate and configured to interact with the slit hole to moveably connect the one of the plurality of pipe support beams to the first bracket and the second bracket;
- a threaded rod passing through the at least one hole through the one of the plurality of pipe support beams, the first bracket, the second bracket, the first bracket plate, the first support plate, the second bracket plate and the second support plate and connected to at least one second coupling nut on each side of the first bracket and the second bracket;
- two rods with heads, wherein one rod is inserted into the at least one hole through the first bracket and the other rod is inserted into the at least one hole through the second bracket, and wherein the two rods are welded together;
- at least one stud configured to interact with the slit hole and to be firmly fixed to or welded into at least one circular hole; and
- two bolts with a threaded middle part and cylindrical end, wherein the circular holes through the first bracket and the second bracket are threaded circular holes, and wherein the bolts are configured to be threaded into threaded circular holes of the first bracket and the second bracket and to interact with the slit hole of the one of the plurality of pipe support beams to moveably connect the one of the plurality of pipe support beams to the first bracket and the second bracket.

15. The pipe support arrangement according to claim 12, each translation limiting assembly comprises a restraining assembly and at least one hole through each of the one of the plurality of pipe support beams, the first bracket, the second bracket, the first bracket plate, the first support plate, the second bracket plate and the second support plate, wherein the at least one hole through the one of the plurality of pipe support beams, the first support plate and the second support plate is a circular hole, and the at least one hole through the at least one first bracket, the at least one second bracket, the first bracket plate and the second bracket plate is a slit hole, and wherein the restraining assembly is entirely or partially arranged through the at least one hole through the one of the plurality of pipe support beams, the first bracket, the second bracket, the first bracket plate, the first support plate, the second bracket plate and the second support plate and is configured to interact with the slit hole through the at least one first bracket, the at least one second bracket, the first bracket plate and the second bracket plate in order to limit translation of the one of the plurality of pipe support beams in the longitudinal direction.

16. The pipe support arrangement according to claim 15, wherein the restraining assembly comprises at least one from a group including:
   at least one restraining bolt installed through the at least one hole through the one of the plurality of pipe support beams, the first bracket, the second bracket, the first bracket plate, the first support plate, the second bracket plate and the second support plate and fastened with at least one first coupling nut to movably connect the one of the plurality of pipe support beams to the first bracket and the second bracket;
   at least one shoulder screw, wherein at least one of the circular holes is a threaded circular hole, and wherein the at least one shoulder screw is configured to be threaded into the at least one circular hole with threads and to interact with the slit hole to moveably connect the one of the plurality of pipe support beams to the first bracket and the second bracket;
   at least one rivet installed through the at least one hole through each of the one of the plurality of pipe support beams, the first bracket, the second bracket, the first bracket plate, the first support plate, the second bracket plate and the second support plate and configured to interact with the slit hole to moveably connect the one of the plurality of pipe support beams to the first bracket and the second bracket;
   a threaded rod passing through the at least one hole through the one of the plurality of pipe support beams, the first bracket, the second bracket, the first bracket plate, the first support plate, the second bracket plate and the second support plate and connected to at least one second coupling nut on each side of the first bracket and the second bracket;
   two rods with heads, wherein one rod is inserted into the at least one hole through the first bracket and the other rod is inserted into the at least one hole through the second bracket, and wherein the two rods are welded together;
   at least one stud configured to interact with the slit hole and to be firmly fixed to or welded into at least one circular hole; and
   two bolts with a threaded middle part and cylindrical end, wherein the circular hole through the first bracket and the circular hole through the second bracket are threaded, and wherein one of the two bolts is configured to be threaded into the threaded circular hole of the first bracket and another of the two bolts is configured to be threaded into the threaded circular hole of the second bracket, and wherein the two bolts interact with the slit hole of the one of the plurality of pipe support beams to moveably connect the one of the plurality of pipe support beams to the first bracket and the second bracket.

17. The pipe support arrangement according to claim 12, wherein each of the plurality of translation limiting assemblies comprise at least one of:
   at least one stud firmly fixed or welded to the first bracket and the second bracket and configured to interact with at least one slit arranged on the one of the plurality of pipe support beams;
   at least one stud firmly fixed or welded to the one of the plurality of structural beams and configured to interact with at least one slit arranged on the one of the plurality of pipe support beams; and
   at least one stud firmly fixed or welded to the first bracket and the second bracket and to the one of the plurality of structural beams and configured to interact with at least one slit arranged on the one of the plurality of pipe support beams.

18. The pipe support arrangement according to claim 12, further comprising insulation that insulates the cooler piping from the plurality of pipe support beams and the plurality of structural beams, wherein the insulation is at least one of electrical insulation and corrosion resistant insulation, and wherein the insulation is:
   arranged between the cooler piping and the plurality of pipe support beams;
   built into the plurality of pipe support beams or surfaces of the plurality of pipe support beams; and
   made by selection of insulating one or more materials or coatings for the first bracket plate, the first support plate, the second bracket plate and the second support plate combined with insulation of the plurality of the translation limiting assemblies.

* * * * *